United States Patent [19]

Aign et al.

[11] 3,998,652

[45] Dec. 21, 1976

[54] AQUEOUS PIGMENT DISPERSIONS

[75] Inventors: Volker Aign, Monheim; Klaus Walz, Bergisch Neukirchen; Reinhold Hörnle, Cologne; Karlheinz Wolf; Norbert Pusch, both of Leverkusen, all of Germany

[73] Assignee: Bayer Aktiengesellschaft, Leverkusen, Germany

[22] Filed: Apr. 25, 1975

[21] Appl. No.: 571,864

[30] Foreign Application Priority Data

May 4, 1974   Germany ........................ 2421606

[52] U.S. Cl. ...................... 106/308 N; 106/288 Q; 106/300; 106/307; 106/288 B; 106/293; 106/301; 106/302; 106/304
[51] Int. Cl.$^2$ ........................ C09C 3/08; C08J 3/00
[58] Field of Search ....... 106/308 N, 308 Q, 288 Q

[56] References Cited

UNITED STATES PATENTS

| | | | |
|---|---|---|---|
| 3,337,360 | 8/1967 | Schönbach et al. | 106/308 N |
| 3,841,888 | 10/1974 | Belde et al. | 106/308 N |

*Primary Examiner*—Winston A. Douglas
*Assistant Examiner*—J. V. Howard
*Attorney, Agent, or Firm*—Plumley and Tyner

[57] ABSTRACT

Aqueous pigment dispersions which contain organic or inorganic pigments and water-soluble oxalkylation products of compounds which are obtainable by condensation of aromatic compounds, containing phenolic OH groups, or their ethers, especially lower alkyl ethers, with formaldehyde and amines which contain at least 2 NH groups which are reactive towards formaldehyde, or derivatives of such oxalkylation products are suitable for pigmenting natural or synthetic materials.

4 Claims, No Drawings

AQUEOUS PIGMENT DISPERSIONS

The invention relates to aqueous pigment dispersions which contain organic or inorganic pigments and water-soluble oxalkylation products of compounds which are obtainable by condensation of aromatic compounds, containing phenolic OH groups, or their ethers, especially lower alkyl ethers, with formaldehyde and amines which contain at least 2 NH groups which are reactive towards formaldehyde, or derivatives of such oxalkylation products, and to their use for pigmenting natural or synthetic materials.

Preferably, the pigment dispersions contain water-soluble oxalkylation products of compounds of the recurring structural units of the formula

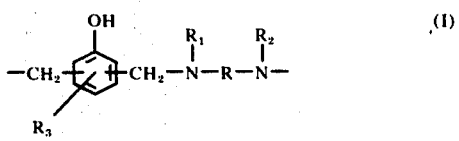

wherein

R denotes a $C_2$-$C_{12}$-alkylene radical optionally interrupted by O, S, $NR_4$, CO, arylene or cycloalkyls, or denotes a $C_5$-$C_7$-cycloalkylene radical, $R_1$ and $R_2$ independently of one another denote hydrogen, $C_1$-$C_4$-alkyl or $C_2$-$C_4$-hydroxyalkyl or conjointly denote a $C_2$-$C_4$-alkylene radical, $R_3$ denotes hydrogen, $C_1$-$C_{12}$-alkyl, $C_5$-$C_7$-cycloalkyl, aryl, aralkyl, halogen, hydroxyl, $C_1$-$C_{18}$-alkoxy, carboxyl or $C_1$-$C_{18}$-alkoxycarbonyl and $R_4$ denotes $C_1$-$C_4$-alkyl or $C_2$-$C_4$-hydroxyalkyl.

In the reaction of the compounds, consisting of units of the formula I, to give the water-soluble oxalkylation products, the alkylene oxides which can be used are ethylene oxide, propylene oxide, butylene oxide, styrene oxide and glycidol, but especially ethylene oxide, optionally together with propylene oxide.

The products obtained by condensation, preferably those containing units of the formula (I), can be obtained in a manner which is in itself known, for example from mixtures of aromatic compounds which contain phenolic OH groups, with amines which contain at least 2 NH groups which are reactive towards formaldehyde, by treatment with formaldehyde or formaldehyde donors, at 20° – 120° C, preferably at 60° – 100° C. The 3 components, namely the phenolic compound, amine and formaldehyde, are preferably employed in the molar ratio of 1:0.5 – 3: 1 – 4. After a reaction time of 2 – 5 hours at 60° – 100° C, the water of reaction is distilled off, suitably in vacuo. The condensation products have an approximate average molecular weight of between 600 and 1,600 and preferably have phenolic radicals as the end group.

Examples of formaldehyde donors which may be mentioned are paraformaldehyde, trioxymethylene, formaldehyde-dimethylacetate and hexamethylenetetramine.

As aromatic compounds which contain phenolic OH groups there may for example be mentioned phenol, cresols, ethylphenols, iso-propylphenols, p-tert.-butylphenol, hydroxyacetophenone, chlorophenols, salicylic acid, p-dimethylaminophenol, p-acetamidophenol, α-naphthol, β-naphthol, alkylnaphthols, tetrahydronaphthols, 4,4'-dihydroxydiphenyl, 4,4'-dihydroxydiphenolmethane, hydroquinone, resorcinol and pyrocatechol as well as the ethers obtainable therefrom, for example by reaction with alkyl halides, alkyl sulphates or alkylene oxides.

As amines which contain at least two NH groups which are reactive towards formaldehyde there may for example be mentioned ethylenediamine, N,N'-dimethylethylenediamine, N-(2-hydroxyethyl)-ethylenediamine, propylenediamine, N-methylpropylenediamine, N,N'-dimethylpropylenediamine, N-butylpropylenediamine, N-tetradecylpropylenediamine, 1,4-butylenediamine, hexamethylenediamine, undecamethylenediamine, 2,2,4-trimethylhexamethylene-1,6-diamine, bis-(3-aminopropyl)-ether, bis-(3-aminopropyl)-methylamine, bis-(3-aminopropyl)-sulphide, ε-aminocaproic acid amide, N,N-bis-(2-carbamoylethyl)-methylamine, 1,4-diamino-cyclohexane, phenylenediamine, naphthylenediamine, 1,4-bis-(aminomethyl)-benzene, 1,3-bis-(aminomethyl)-4,6-dimethylbenzene and piperazine.

The oxalkylation is carried out in a known manner, for example by addition of alkaline catalysts, such as alkali metal hydroxides or alkali metal alcoholates, and alkylene oxides at 100° – 160° C. Preferred products are obtained with ethylene oxide, optionally with the addition of small amounts of propylene oxide, butylene oxide or styrene oxide or their mixtures, 30 – 120 mols of ethylene oxide, especially 50 – 80 mols of ethylene oxide, being employed per mol of the phenolic compound.

Preferred oxalkylation products are those which are obtained by reaction of condensation products of $C_6$-$C_{12}$-alkylphenols or cyclohexylphenol with $C_2$-$C_{12}$-alkylenediamines, especially with $C_4$-$C_8$-alkylenediamines, and formaldehyde with 30 – 120, especially 50 – 80, mols of ethylene oxide (relative to alkylphenol).

As derivatives of the oxalkylation products to be used according to the invention it is possible to use, for example, quaternisation products, such as are obtained by reaction of the oxalkylation products with, for example, dimethyl sulphate, diethyl sulphate, chloroacetamide or benzyl chloride, or salts of half-esters with inorganic acids, such as are obtained by reaction of the oxalkylation products with polybasic inorganic acids or their derivatives, for example sulphuric acid, chlorosulphonic acid, amidosulphonic acid, phosphoric acid or phosphorus pentoxide, followed by neutralisation with organic or inorganic bases.

The pigment dispersions according to the invention can furthermore contain customary additives such as agents which prevent drying up, for example formamide, glycol or diglycol, anionic or non-ionic surface-active agents, for example ethanolammonium dodecylbenzenesulphonate or surface-active addition products of ethylene oxide, such as are described, for example, by N. Schönfeldt, as well as preservatives, for example sodium pentachlorophenolate and water or water-miscible organic solvents, such as methyl-2,4-pentanediol, ethylene glycol or 1,2-propanediol.

Pigments which can be used are both organic pigments, for example pigments of the azo, anthraquinone, azaporphine, thioindigo or polycyclic series and also of the quinacridone, dioxazine, naphthalenetetracarboxylic acid or perylenetetracarboxylic acid series, such as are known from the Colour Index, 2nd edition, and inorganic pigments, such as zinc sulphides, cadmium sulphides or selenides, ultramarine, titanium dioxide, iron oxides, nickel or chromium titanium yellow, chromium oxides, chromate pigments and carbon black as well as their mixtures.

The pigment dispersions according to the invention are manufactured in the customary manner, for example by working the mixture in conventional wet comminution equipment, such as kneaders, kneading screws, ball mills, rotor-stator mills, dissolvers, corundum disc mills, vibratory mills and, with particular advantage, high-speed stirred ball mills with grinding bodies of size 0.1 – 100 mm $\phi$, especially with glass beads of 0.2 – 1 mm $\phi$.

These pigment dispersions according to the invention are universally employable and are outstandingly suitable for the production of emulsion paints based on polyvinyl acetate, polyvinyl acetate copolymers, styrene-butadiene copolymers, polyvinyl propionates, acrylic acid ester and methacrylic acid ester polymers, saponified alkyld resins and oil emulsions, for the production of wallpaper paints, based on cellulose derivatives, such as methylcellulose, hydroxymethylcellulose or carboxymethylcellulose, and for the production of printing inks which predominantly contain saponified natural resins such as shellac, saponified water-soluble synthetic resins or acrylate binder solutions as the binder.

Compared with known pigment dispersions, for example those from German Patent Specification No. 949,284, the dispersions according to the invention have the advantage of being more universally applicable and of having a substantially lower viscosity at a given pigment concentration.

EXAMPLE 1

A mixture consisting of 48.0 g of a pigment of the following structure

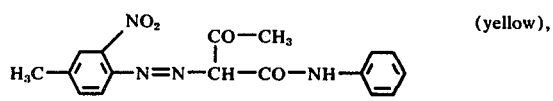
(yellow), 9.6 g of the condensation product described below, having the following structure

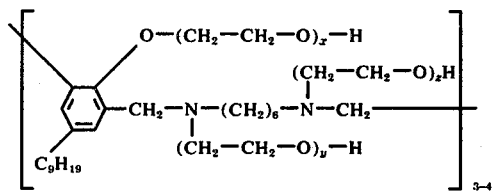

wherein $x$, $y$ and $z$ together denote about 60, 18.0 g of 1,2-propanediol, 0.6 g of sodium pentachlorophenolate and 23.8 g of water is homogenised by stirring and subsequently ground in a continuously operating commercially available stirred ball mill, which contains glass beads of 0.3 – 0.5 mm $\phi$ as the grinding bodies, until the pigment has been finely divided to a size of 1 – 2 $\mu$.

The pourable homogeneous pigment preparation thus produced is very suitable for colouring aqueous paints based on plastics emulsions, for colouring wallpaper paints based on plastics emulsions and cellulose derivatives, and for colouring printing inks based on saponified water-soluble natural resins and synthetic resins.

The condensation product used was prepared as follows:

110 g of nonylphenol, 58 g of hexamethylenediamine and 30 g of paraformaldehyde were mixed at 50° –60° C and stirred for 5 hours at 90° C. The water of reaction was then distilled off in vacuo. 36 g of the condensation product thus obtained were reacted with 264 g of ethylene oxide, in the presence of 0.4 g of powdered potassium hydroxide, at 120° – 140° C.

EXAMPLE 2

A finely divided pigment dispersion consisting of 45.0 g of a pigment of the following structure

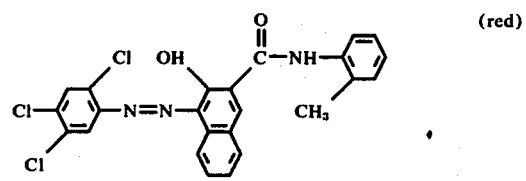
(red)

8.0 g of the condensation product used in Example 1, 20.0 g of diethylene glycol, 0.6 g of pentachlorophenol and 26.4 g of water is prepared as in Example 1.

EXAMPLE 3

A finely divided pigment dispersion consisting of 35.0 g of carbon black, 8.8 g of the condensation product used in Example 1, 12.0 g of 1,2-propanediol, 0.4 g of sodium trichlorophenolate and 44.2 g of water is prepared as in Example 1.

EXAMPLE 4

A finely divided pigment dispersion consisting of 45.0 g of perchlorinated copper phthalocyanine (green), 9.0 g of the condensation product used in Example 1, 1.7 g of an anionic surface-active agent of the following structure

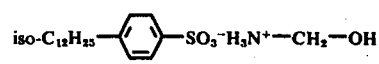

10.0 g of triethylene glycol and 0.6 g of sodium trichlorophenolate and 34.0 g of water is prepared as in Example 1.

EXAMPLE 5

A finely divided pigment dispersion consisting of 40.0 g of copper phthalocyanine in the α-modification (blue), 10.0 g of the condensation product described in Example 1, 10.0 g of triethylene glycol, 1.5 g of an anionic surface-active agent of the following structure

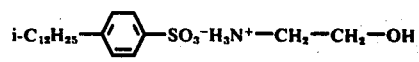

0.6 g of pentachlorophenol and 39.9 g of water is prepared as in Example 1.

EXAMPLE 6

Instead of the condensation products employed in Example 1 – 5, the following compounds can be used in the same way:

a. 36 g of the condensation product, described in Example 1, of 110 g of nonylphenol, 58 g of hexamethylenediamine and 30 g of paraformaldehyde are reacted with 176 g of ethylene oxide in the presence of 0.4 g of powdered potassium hydroxide, or b. 36 g of the condensation product, described in Example 1, of 110 g of nonylphenol, 58 g of hexamethylenediamine and 30 g of paraformaldehyde are reacted with 440 g of ethylene oxide in the presence of 0.4 g of powdered potassium hydroxide, or c. 36 g of the condensation product, described in Example 1, of 110 g of nonylphenol, 58 g of hexamethylenediamine and 30 g of paraformaldehyde are reacted with 18 g of propylene oxide and thereafter with 264 g of ethylene oxide in the presence of 0.4 g of powdered potassium hydroxide, or d. 88 g of cyclohexylphenol, 58 g of hexamethylenediamine and 30 g of paraformaldehyde are mixed at 50° - 60° C and then stirred for 5 hours at 90° C. The water of reaction is then distilled off in vacuo. 32 g of the condensation product thus obtained are reacted with 264 g of ethylene oxide in the presence of 0.4 g of powdered potassium hydroxide.

e. 40 g of a condensation product which was prepared, analogously to the condensation product described in Example 1, from 131 g of dodecylphenol, 58 g of hexamethylenediamine and 30 g of paraformaldehyde, are reacted with 264 g of ethylene oxide in the presence of 0.4 g of powdered KOH.

f. 33 g of a condensation product which was prepared, analogously to the condensation product described in Example 1, from 150 g of p-tert. butylphenol, 158 g of a mixture of 2,2,4-trimethylhexamethylenediamine and 2,4,4-trimethylhexamethylenediamine and 60 g of paraformaldehyde, are reacted with 220 g of ethylene oxide in the presence of 0.5 g of sodium methylate.

g. 34 g of a condensation product which was prepared, analogously to the condensation product described in Example 1, from 110 g of nonylphenol, 46 g of tetramethylenediamine and 100 g of a 30% strength aqueous formaldehyde solution, are reacted with 220 g of ethylene oxide in the presence of 0.4 g of powdered KOH.

We claim:

1. Aqueous pigment dispersion containing an organic or inorganic pigment and a water-soluble oxyalkylation product of compound of recurring structural units of the formula

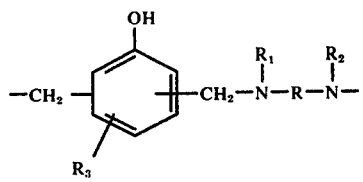

wherein
R denotes a $C_2$-$C_{12}$-alkylene radical optionally interrupted by O, S, $NR_4$, CO, arylene, or cycloalkyl, or denotes a $C_5$-$C_7$-cycloalkylene radical;
$R_1$ and $R_2$ independently of one another denote hydrogen, $C_1$-$C_4$-alkyl, or $C_2$-$C_4$-hydroxyalkyl; or conjointly denote a $C_2$-$C_4$-alkylene radical;
$R_3$ denotes hydrogen, $C_1$-$C_{12}$-alkyl, $C_5$-$C_7$-cycloalkyl, aryl, aralkyl, halogen, hydroxyl, $C_1$-$C_{18}$-alkoxy, carboxyl, or $C_1$-$C_{18}$-alkoxycarbonyl; and
$R_4$ denotes $C_1$-$C_4$-alkyl or $C_2$-$C_4$-hydroxyalkyl; prepared by condensing the corresponding phenolic compound, the corresponding amine and formaldehyde in the molar ratio of 1:0.5 - 3:1-4.

2. Aqueous pigment dispersion according to claim 1 comprising 35 to 48% of the inorganic or organic pigment and 8 to 10% of the water-soluble oxalkylation product.

3. Aqueous pigment dispersion according to claim 1 wherein said water-soluble oxyalkylation product is produced by reacting said compound of recurring structural units of the formula

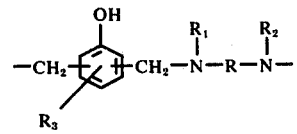

with ethylene oxide, propylene oxide, or mixtures of ethylene oxide and propylene oxide.

4. Aqueous pigment dispersions according to claim 1, containing water-soluble oxethylation products of compounds which are obtainable by condensation of $C_6$-$C_{12}$-alkylphenols or cyclohexylphenol with formaldehyde and $C_2$-$C_{12}$-alkylenediamines.

* * * * *